United States Patent Office 3,780,095
Patented Dec. 18, 1973

3,780,095
ACYLATED ANILINO-CARBOXYLIC ACIDS AND THEIR SALTS
Kurt Klemm, Allensbach, Walter Krastinat and Richard Riedel, Constance, and Wolfgang Schoetensack, Hegne, Germany, assignors to BYK-Gulden Lomberg Chemische Fabrik GmbH, Constance, Germany
No Drawing. Filed Apr. 8, 1970, Ser. No. 26,113
Int. Cl. C07c 101/44, 101/72
U.S. Cl. 260—518 A
22 Claims

ABSTRACT OF THE DISCLOSURE

Acylated anilino-carboxylic acids which are effective chloretics and their manufacture.

---

The invention concerns acylated anilino-carboxylic acids of the general formula

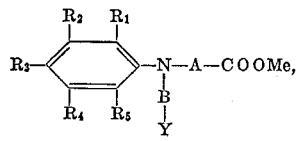

wherein the residues mean:

$R_1$, $R_2$, $R_3$, $R_4$, $R_5$: hydrogen, each one alkyl-, alkoxy-, or alkylmercapto group up to 4 carbon atoms, furthermore, halogen and the trifluoromethyl group,
$R_3$: moreover, the benzyloxy- or hydroxy group,
A: a straight-chain alkylene residue with 2 to 6 carbon atoms,
B: the carbonyl- or methylene group,
Y: an alkyl- or cycloalkyl residue up to 6 carbon atoms as well as unsubstituted aryl residue or an aryl residue substituted by halogen atoms or by alkyl-, alkoxy-, or alkylmercapto groups up to 6 carbon atoms, furthermore, substituted by carboxy-, sulfonamido-, trifluoromethyl-, or nitro groups,
Me: hydrogen or a salt-forming, pharmacologically acceptable cation, preferably, sodium, potassium, calcium, magnesium, aluminum, glucosamine, N-methylglucosamine, ethanolamine, diethanolamine, triethanolamine, ethylene diamine.

The object of the invention is, furthermore, a process for the manufacture of the acylated anilino-carboxylic acids of the type stated. It consists therein that anilinocarboxylic acid esters of the general formula

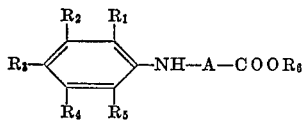

wherein the residues have the meaning stated and $R_6$ stands for an alkyl residue up to 4 carbon atoms or a dialkylaminoalkyl residue with up to each 4 carbon atoms, is reacted with a carboxylic acid of the formula

Y—COOH wherein Y has the meaning stated, or with a reactive derivative of the said acid and the reaction products are subsequently saponified and isolated. For the case that $R_3$ stands for the benzyloxy residue, a catalytic splitting-off of the benzyl group is carried out, whereby the corresponding hydroxy compound is obtained.

A further object of the invention comprises the conversion of the acylated anilino-carboxylic acids of the invention, into their salts.

The starting materials for the process are the anilinocarboxylic acid esters, preferably, the methyl- or ethyl esters. Insofar as these represent new compounds, their preparation, starting from known substances, is described.

The anilino-carboxylic acid esters are acylated in a manner known per se, whereby, especially, the chlorides or anhydrides of the carboxylic acids stated are ueseful. Suitable organic bases, like pyridine, are utilized as acid-binding agents, and benzene or other inert media are used as preferred solvents. The acylated anilino-carboxylic acid esters are obtained in good yield and purity. These are, subsequently, saponified whereby potash lye in methanolic or ethanolic solution are preferred. As a solvent, methanol or ethanol, corresponding to the type of ester to be saponified, is utilized. To avoid side reactions, the saponification is carried out at room temperature, preferably, however, at temperatures up to 50° C., whereby the reaction is terminated within 24 hours. After extraction of unchanged initial material with a solvent, not miscible with water, like benzene, the aqueous phase obtained is acidified, whereby the anilino-carboxylic acid, acylated, according to the invention, precipitate and are readily purified by recrystallization.

For the case that $R_3$ represents the benzyloxy residue, a catalytic debenzylation follows in a suitable solvent like tetrahydrofuran and in the presence of palladium black (5%). Upon the working up the corresponding hydroxy compound is then obtined in good yield.

The compounds, according to the invention, act strongly choleretically, as the pharmacological examination has shown in rats:

Experimental methodology

With Sprague-Dawley rats (average weight 200–300 g.) which had been narcotized by the i.m.-injection of 1.25 g./kg. urethane, the abdominal cavity was opened medially, the Ductus cholerochus was tied off, and to the part which leads to the liver there is connected a canule. By means of a thin polyvinyl chloride tube, the emerging bile was directly conducted into a 1 ml. graduated pipette, the bile volume excrete was determined at intervals of 30 minutes and, subsequently, the bile secreted from 2 animals each was dried on small lamp glasses at 110° C. for approximately 10 hours and its dry weight was acertained. (Preliminary tests showed that following storing for more than 10 hours at 110° C., no change in weight set in any more.) The substances were administered intraduodenaly 2 hours after the beginning of the experiment, i.e., at a point of time when the bile flow remains constant. The body temperature was kept at approximately 37° C. (rectal thermometer) by means of heating pads and irradiation.

The acylated anilino-carboxylic acids, according to the invention, were administered as sodium salts. For a comparison, there is used dehydrocholic acid "Decholin®," known as a choleretic agent, which was likewise used as sodium salt.

In Figures 1 and 2, the choleretic action of polyethylene glycol 300 DAB is recorded among other things in addition to the untreated animals serving as controls.

From Table 1 and Figures 1 and 2 it results that the anilino-carboxylic acids, acylated, according to the invention, exert a strongly choleretic activity. They are superior to dehydrocholic acid, with regard to the maximum as well as with regard to the total increase in the bile secretion and the secretion of dry bilary constituents.

Table 1 shows that the duration of the effect of the excess secretion of bile and dry biliary constituents caused by the compounds of the invention is several times that of the standard.

Further, the low toxicity of the compounds of the invention has to be noted, as the values of the $LD_{50}$ in mg./kg. demonstrate, determine in the rat. Quantities of 2 g. of some of the compounds, according to the invention, have been tolerated without toxicity. These compounds are comparable to dehydrocholic acid.

From the Dutch patent application 6805246, certain acylated anilino-carboxylic acids are known which derive from glycine, alanine, and phenyl-alanine. These compounds are said to act in certain inflammatory and non-inflammatory muscular affections and, moreover, are said to have analgetic effects.

In contrast, the compounds, according to the invention, have none of these properties, which is surprising in view of the close relation to the compounds known.

Further, it has been ascertained that these known compounds are considerably more toxic than the compounds which are described in the present invention.

In Table 2, some of the known compounds with the branched residue A, designated with the numbers 143, 141, 39, and 28 are compared with regard to the $LD_{50}$ values, which have been determined by intraperitoneal application in the mouse, with some of the compounds characterized by the straight residue A of the present invention. The values show that the known compounds are 2 to 3 times more toxic than the substances of the present invention. The technical progress which can be attained with these compounds is herewith established. The preparation of the compounds, according to the invention, is described in the following non-limitable examples.

TABLE 1

The choleretic effect of acylated γ-anilino-carboxylic acids, measured by the excess secretion of biliary and dry biliary constituents within 2.5 hours after the intraduodenal administration in the narcotized rat.

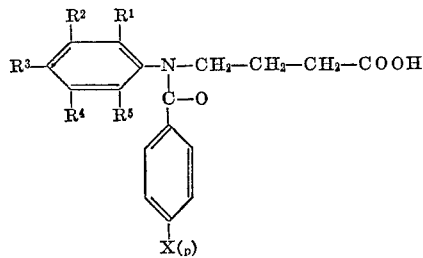

| | Number of— | | Substituents | | | | | | Increase of the secretion of— | | | | | |
|---|---|---|---|---|---|---|---|---|---|---|---|---|---|---|
| | | | | | | | | | Bile (in ml.)—Dose (mg./kg., i.d.) | | | Dry biliary constituents (mg.)—Dose (mg./kg., i.d.) | | |
| Consecutive number | Ex. | Substance | $X_{(p)}$ | $R^1$ | $R^2$ | $R^3$ | $R^4$ | $R^5$ | 20 | 40 | 80 | 20 | 40 | 80 |
| 1 | 5 | B 6518 | Cl | H | H | OCH₃ | H | H | 0.440 | 0.748 | 1.422 | 7.63 | 15.50 | 23.66 |
| 2 | 14 | B 67347 | Cl | CH₃ | H | H | H | CH₃ | 0.976 | 1.738 | 1.773 | 10.57 | 20.88 | 23.49 |
| 3 | 7 | B 67348 | Cl | H | H | OC₂H₅ | H | H | 0.448 | 0.962 | 1.703 | 5.86 | 14.47 | 22.91 |
| 4 | 10 | B 67350 | Cl | OCH₃ | H | OCH₃ | H | H | 0.462 | 1.141 | 1.103 | 5.81 | 14.64 | 19.14 |
| 5 | 11 | B 67353 | Cl | H | OCH₃ | OCH₃ | H | H | 0.562 | 1.185 | 2.097 | 7.22 | 12.69 | 31.36 |
| 6 | 13 | B 67358 | {H (o-Cl)} | CH₃ | H | H | H | CH₃ | 0.598 | 1.097 | 2.313 | 7.83 | 16.22 | 38.33 |
| 7 | | | | | | | | | | | | | | |
| 8 | | Dehydrocholic acid ("Decholin") | | | | | | | 0.025 | 0.228 | 0.677 | 1.51 | 7.53 | 23.31 |
| | | Controls | | | | | | | | 0.037 | | | −3.45 | |

| | Duration of the excess secretion (in min.) of— | | | | | | Median lethal dose ($LD_{50}$ mg./kg.) | | | |
|---|---|---|---|---|---|---|---|---|---|---|
| | Bile | | | Dry biliary constituents | | | In the mouse | | | In the rat |
| Consecutive number | 20[1] | 40[1] | 80[1] | 20[1] | 40[1] | 80[1] | Oral | I.p. | I.v. | Oral |
| 1 | 125 | 148 | (205) | 108 | 150 | (200) | | | 570 | >2.000 |
| 2 | 160 | (210) | >(210) | 152 | (210) | >(210) | 710 | | 300 | 1.900 |
| 3 | 130 | (210) | | 98 | 173 | (230) | 2,200 | | 510 | >2.000 |
| 4 | 150 | (195) | (210) | 90 | 150 | (196) | 1,265 | | 710 | >1.000 |
| 5 | 119 | 135 | (210) | 99 | 106 | (210) | | 1,000 | 1,000 | |
| 6 | 104 | 126 | (195) | 80 | 112 | 180 | | 60 | 2,760 | >2.000 |
| 7 | 45 | 58 | 96 | 48 | 62 | 105 | | | | |

[1] Milligrans/kilogram.

TABLE 2

Acute toxicity of various substituted acylated anilino-carboxylic acids in dependence on the length of the alkylene chain at a single dose, in the mouse ($LD_{50}$)

| Structure | B-Nr. B-No. | Z | A | $LD_{50}$ |
|---|---|---|---|---|
| Cl—⟨⟩—N(A—COOH)(C(=O)Z) | [1] 143 | —C₂H₅ | C₄H₉ —CH— | 430 |
| | 67344 | —CH₃ | —CH₂—CH₂—CH₂— | 1,220 |
| CF₃—⟨⟩—N(A—COOH)(C(=O)Z) | [1] 141 | Same as above | C₄H₉ —CH— | 714 |
| | 67338 | do | —CH₂CH₂CH₂— | 1,500–2,000 |
| CH₃O—⟨⟩(OCH₃)—N(A—COOH)(C(=O)Z) | [1] 39 | —⟨⟩—Cl | C₄H₉ —CH— | 380 |
| | 67353 | Same as above | —CH₂CH₂CH₂— | 1,004 |
| ⟨⟩(CH₃)(CH₃)—N(A—COOH)(C(=O)Z) | [1] 28 | do | C₄H₉ —CH— | 125 |
| | 66356 | do | —CH₂CH₂— | 330 |
| | 66347 | do | —CH₂CH₂CH₂— | { 710 / 305 } |

[1] Controls.

FIG. 1. CHOLERETIC EFFECT OF SOME γ-ANILINO-CARBOXYLIC ACIDS, MEASURED ON THE MAXIMAL AND TOTAL INCREASE OF THE BILIARY SECRETION WITHIN 2.5 HOURS AFTER THE ADMINISTRATION OF THE SUBSTANCE

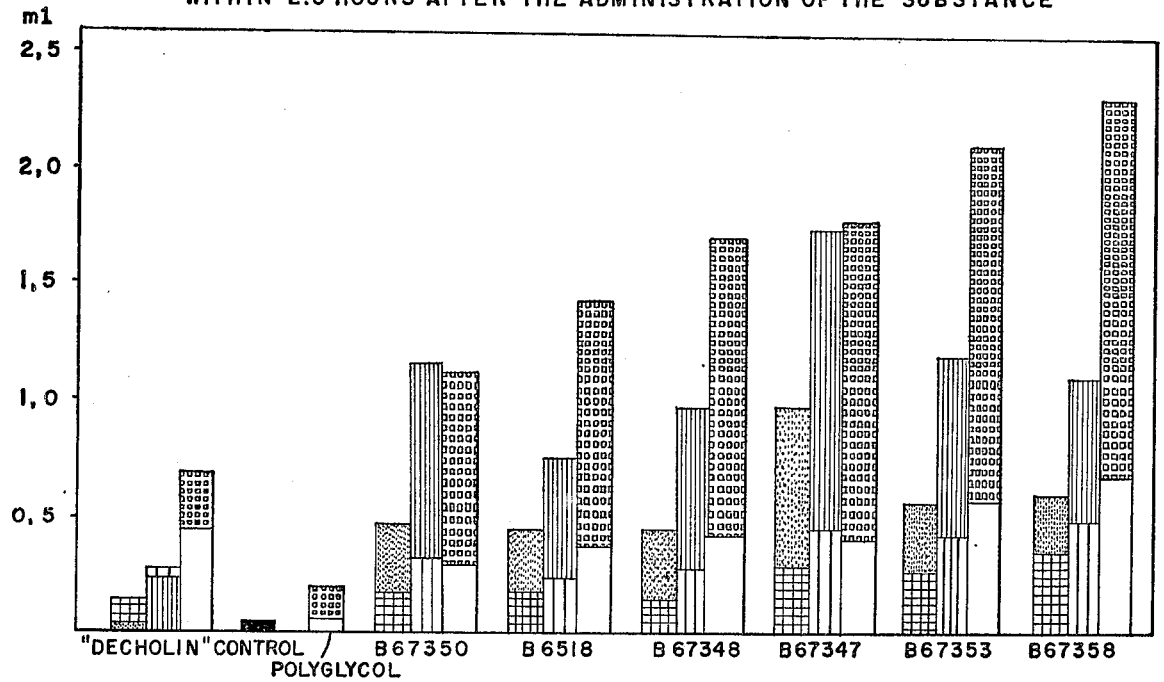

MAXIMAL INCREASE OF BILIARY SECRETION EACH 30 MIN. (in ml) WITHIN 2.5 HOURS AFTER THE i.d. ADMINISTRATION OF EACH 20 (▦), 40 (▥), AND 80 (☐) mg/kg OF THE COMPOUNDS ENTERED.

TOTAL INCREASE OF THE BILIARY SECRETION (in ml) WITHIN 2.5 HOURS AFTER THE ADMINISTRATION OF EACH 20 (▨), 40 (▓), AND 80 (▩) mg/kg OF THE COMPOUNDS ENTERED

FIG. 2. CHOLERETIC EFFECT OF SOME γ-ANILINO-CARBOXYLIC ACIDS, MEASURED ON THE MAXIMAL AND TOTAL INCREASE OF THE SECRETION OF DRY BILIARY CONSTITUENTS WITHIN 2.5 HOURS AFTER THE ADMINISTRATION OF THE SUBSTANCE.

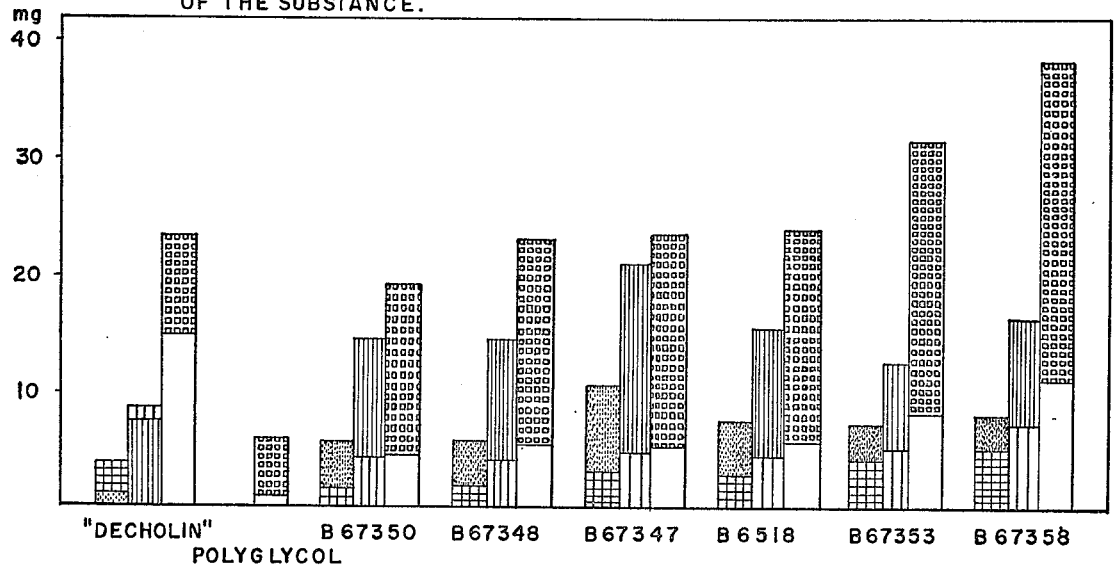

MAXIMAL INCREASE OF SECRETION OF DRY BILIARY CONSTITUENTS EACH 30 MIN. (in mg) WITHIN 2.5 HOURS AFTER THE i.d. ADMINISTRATION OF EACH 20 (▦), 40 (▥) AND 80 (☐) mg/kg OF THE COMPOUNDS ENTERED.

TOTAL INCREASE OF THE SECRETION OF DRY BILIARY CONSTITUENTS (in mg) WITHIN 2.5 HOURS AFTER THE ADMINISTRATION OF EACH 20 (▨), 40 (▓), AND 80 (▩) mg/kg OF THE COMPOUNDS ENTERED.

Reaction Scheme (Figure 3)

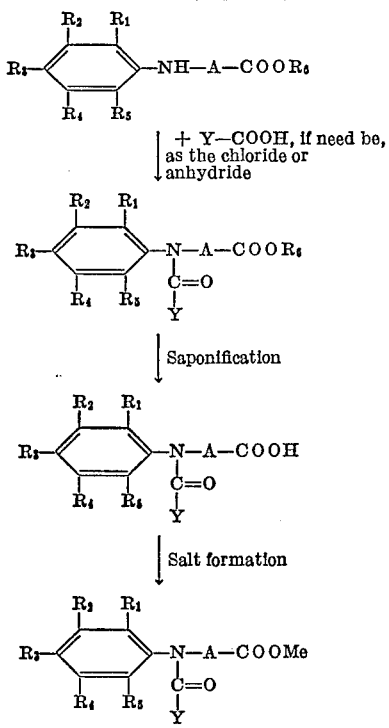

EXAMPLE 1

N-acetyl-γ-(m-trifluoromethyl-anilino)-butyric acid 19.5 g. γ-bromobutyric acid ethyl ester, 35.4 g. m-trifluoromethyl-aniline in 150 ml. benzene is heated for 50 hours to boiling. The m-trifluoromethyl-aniline hydrobromide precipitated is filtered off and the filtrate is concentrated by evaporation. The residue is dissolved in 100 ml. ethanol and the solution is rendered strongly acid with alcoholic hydrochloric acid. 16 g. (51.4%) γ-(m-trifluoromethyl-anilino)-butyric acid ethyl ester hydrochloride, M.P. 128–129° C., crystallizes out. This salt is heated with 27.2 g. acetic acid anhydride and 4.7 g. anhydrous sodium acetate for 4 hours to boiling. Upon decomposition of the excess of acetic acid anhydride with water, 15.6 g. (95.7%).

N-acetyl-γ-(m - trifluoromethyl - anilino)-butyric acid ethyl ester is obtained as a water-insoluble, non-distillable oil. 15.6 g. N-acetyl-γ-(m-trifluoromethyl-anilino)-butyric acid ethyl ester is dissolved in 100 ml. ethanol and mixed with a solution of 4.1 g. potassium hydroxide in 50 ml. ethanol. The homogenous mixture remains standing for perhaps 24 hours at room temperature (approximately 20° C.) and is then evaporated in vacuo at a bath temperature of maximum 50° C. The residue is dissolved in water and the unsaponified parts are extracted with benzene. With the acidification of the aqueous phase the N-acetyl-γ-(m-trifluoromethyl-anilino)-butyric acid precipitates as a water-insoluble oil that solidifies upon longer standing. 13.1 g. (92% of the theory) is obtained. The compound melts upon recrystallization from a mixture of benzene-light gasoline 1:1 at 106.5–107.5° C.

EXAMPLE 2

N-acetyl-γ-(m-chloro-anilino)-butyric acid 19.5 g. γ-bromobutyric acid ethyl ester, 12.8 g. m-chloro-aniline, and 12.9 g. N-ethyl-diisopropyl amine is heated 8 hours to 100° C. and filtrated upon the addition of ether. The residue of evaporation of the filtrate (24.1 g.) consists of -(m-chloro-anilino)-butyric acid ethyl ester. This is heated with 60 ml. acetic acid anhydride for two hours to boiling. Upon the decomposition of the excess anhydride with water 27.3 g. N-acetyl-γ-(m-chloro-anilino)-butyric acid ethyl ester is obtained as a water-insoluble, non-distillable oil. The saponification of the latter (see Example 1) yields 13.3 g. (54%) N-acetyl-γ-(m-chloro-anilino)-butyric acid of the M.P. 114.5–115.5° C. (from benzene).

EXAMPLE 3

N-(p-chloro-benzoyl)-γ-(m-chloro-anilino)-butyric acid 14.3 g. γ-(m-chloro-anilino)-butyric acid ethyl ester (see Example 2) is acylated with 11.4 g. p-chloro-benzoyl chloride and 5.2 g. pyridine in 180 ml. benzene. 20.3 g. (92.7%) N-(p-chloro-benzoyl)-γ-(m - chloro - anilino)-butyric acid ethyl ester is obtained as a water-insoluble, non-distillable oil. The saponification of this ester (method of working as in Example 1) yields 12.8 g. (68%) N-(p-chloro-benzoyl)-γ-(m-chloro - anilino)-butyric acid of the M.P. 98.5° C. (from benzene-light gasoline 1:1).

EXAMPLE 4

N-benzoyl-γ-(p-anisidino)-butyric acid 9.75 g. γ-bromo-butyric acid ethyl ester, 6.15 g. p-anisidine, and 9 g. dicyclohexylamine is heated to 100° C. After the working up (as in Example 2) one obtains 11.5 g. (96%) γ-(p-anisidino)-butyric acid ethyl ester, M.P.=39–40° C. (from cyclohexane). The acylation with 7.5 g. benzoyl chloride and 4.2 g. pyridine in 150 ml. benzene yields 13 g. (75.6%) N-benzoyl-γ-(p-anisidino)-butyric acid ethyl ester as an oil, insoluble in water and non-distillable. The saponification of this ester with alcoholic potash lye (method of working as in Example 1) yields 8.9 g. (74.5%) N-benzoyl-γ-(p-anisidino)-butyric acid of the M.P. 156–157° C. (from acetic ester).

EXAMPLE 5

N-(p-chloro-benzoyl)-γ-(p-anisidino)-butyric acid 191.3 g. 1-(p-methoxy-phenyl)-pyrrolidone-2 (1 mol), 500 ml. methanol, and 204 g. sulfuric acid (96%) (2 mol) is heated in an autoclave to 100° C. for 8 hours. Upon the distilling of the excess methanol the residue of evaporation is dissolved in 500 ml. water and upon the addition of 1 liter benzene is neutralized with about 300 ml. 30% sodium lye (pH=7). Upon shaking out, the phases are separated and the benzene solution is extracted with 1.4 liter 1-N-hydrochloric acid. With the distilling of the benzene, 23.8 g. initial material remain and from the hydrochloric solution 196.1 g. [95.1% in reference to reacted 1-(p-methoxy-phenyl)-pyrrolidone-2] γ-(p-anisidino)-butyric acid-methyl ester, M.P.=59–60° C. (from cyclohexane) is obtained by neutralizing.

196.1 g. γ-(p-anisidino)-butyric acid methyl ester is dissolved in 300 ml. benzene and upon the addition of 70 g. pyridine is treated with a mixture of 154 g. p-chloro-benzoyl chloride and 250 ml. benzene under strong agitation. After about one hour the pyridine hydrochloride crystallized out is sucked off, washed well, and the benzene is evaporated to dryness. The residue of evaporation is dissolved and allowed to crystallize from approximately 500 ml. cyclohexane. One obtains 280 g. (88%) N-(p-chloro-benzoyl)-γ-(p-anisidino)butyric acid methyl ester of the M.P. 96° C.

280 g. N-(p - chloro - benzoyl)-γ-(p-anisidino)-butyric acid methyl ester is dissolved in 1 liter benzene and treated under strong agitation with a solution of 55 g. potassium hydroxide in 150 ml. methanol. The homogenous solution is stirred for 4 hours at room temperature and is then shaken out with 1 liter water. With the acidification of the aqueous phase (about the pH 3) N-(p-chloro-benzoyl)-γ-anisidino-butyric acid precipitates as a quickly solidifying oil. The yield is 245 g. (91%). The compound melts upon recrystallization from acetic ester at 115–116° C.

EXAMPLE 6

N-acetyl-γ-(p-phenetidino)-butyric acid 19.5 g. γ-bromo-butyric acid ethyl ester, 13.7 g. p-phenetidine, and 10.1 g. triethylamine is reacted, according to the method of working described in Example 2. 24.1 g. (96%) γ-(p-phenetidino)-butyric acid ethyl ester of the M.P. 48–49° C. (from petroleum ether) is obtained. This ester is acrylated by boiling for 2 hours in 50 ml. acetic acid anhydride. Upon the working up (method of working, according to that in Example 1) 25 g. (89%) N-acetyl-γ-(p-phenetidino)-butyric acid ethyl ester is obtained as an oil that is insoluble in water. The saponification with alcoholic potash lye yields therefrom 19.5 g. (87%) N-acetyl-γ-(p-phenetidino)-butyric acid of the M.P. 92–93° C. (from cyclohexane).

EXAMPLE 7

N-(p-chlorobenzoyl)-γ-(p-phenetidino)-butyric acid 27.4 g. γ-(p-phenetidino)-butyric acid ethyl ester (see Example 6) is acylated with 20.1 g. p-chloro-benzoyl chloride and 9.1 g. pyridine in 300 ml. benzene. One obtains 39.6 g. (93%) N-(p-chlorobenzoyl)-γ-(p-phenetidino)-butyric acid ethyl ester as an oil that is not distillable. The saponification of this ester with alcoholic potash lye yields 35.1 g. (95.5%) N-(p-chloro-benzoyl)-γ-(p-phenetidino)butyric acid of the M.P. 106–107° C. (from acetic ester).

EXAMPLE 8

N-(p-chloro-benzoyl)-γ-(2,3-dimethyl-anilino)-butyric acid 19.5 g. γ-bromo-butyric acid ethyl ester, 12.1 g. 2,3-dimethylaniline, and 18.1 g. dicyclohexyl amine is heated for 6.5 hours to 100° C. After the working up one obtains 23 g. (98%) γ-(2,3-dimethyl-anilino)-butyric acid ethyl ester. The acylation of this ester with 19.3 g. p-chloro-benzoyl chloride and 8.7 pyridine in 160 ml. benzene yields 30.4 g. (83%) N-(p-chlorobenzoyl)-γ-(2,3-dimethyl-anilino)-butyric acid ethyl ester, an oil that is insoluble in water and not distillable. By the saponification with alcoholic potash lye one obtains therefrom 23.1 g. (82.4%) N - (p-chloro-benzoyl)-γ-(2,3-dimethyl-anilino)-butyric acid of the M.P. 137–138° C. (from isopropanol).

EXAMPLE 9

N-propionyl-γ-(2,4-dimethoxy-anilino)-butyric acid 19.5 g. γ-bromo-butyric acid ethyl ester, 15.3 g. 2,4-dimethoxy-aniline, and 12.9 g. N-ethyl-diisopropyl amine is reacted, according to the method of working described in Example 2. One obtains 25.8 g. (96.7%) γ-(2,4-dimethoxy-anilino)-butyric acid ethyl ester. The ester is kept in a mixture of 50 g. propionic acid anhydride and 50 ml. pyridine and maintained at room temperature for 48 hours. After distilling off the excess acylation mixture, 31 g. N-propionyl-γ-(2,4-dimethoxy-anilino)-butyric acid ethyl ester remains as an oil that is not distillable. The saponification of this ester with alcoholic potash lye yields 22.6 g. (79.7%) N-propionyl-γ-(2,4-dimethoxy-ailino)-butyric acid of the M.P. 93.5–94.5° C. (from benzene-light gasoline, 2:1).

EXAMPLE 10

N-(p-chloro-benzoyl)-γ-(2,4-dimethoxy-anilino)-butyric acid 25.8 g. γ-(2,4-dimethoxy-anilino)-butyric acid ethyl ester (see Example 9) is acylated with 18.6 g. p-chloro-benzoyl chloride and 8.4 g. pyridine in 200 ml. benzene. After the working up one obtains 36.5 g. (93%) N-(p-chloro-benzoyl)-γ-(2,4-dimethoxy-anilino) - butyric acid ethyl ester as an oil that cannot be distilled. Its saponification with alcoholic potash lye yields 25.4 g. (75%) N-(p-chloro-benzoyl)-γ-(2,4-dimethoxy-anilino)-butyric acid of the M.P. 124–125° C. (from benzene-light gasoline, 2:1).

EXAMPLE 11

N-(p-chloro-benzoyl)-γ-(3,4-dimethoxy-anilino)-butyric acid

From 19.5 g. γ-bromo-butyric acid ethyl ester, 15.3 g. 4-amino-veratrol, and 12.9 g. N-ethyl-diisopropyl amine 25.3 g. (95% of the theory), γ-(3,4-dimethoxy-anilino)-butyric ethyl ester is obtained, according to the method of working described in Example 2. By the acylation with 18.3 g. chloro-benzoyl chloride and 8.2 g. pyridine in 200 ml. benzene, this ester is transformed into 35.5 g. (92% of the theory) N-(p-chloro-benzoyl)-γ-(3,4-dimethoxy-anilino)-butyric acid ethyl ester; its saponification with alcoholic potash lye yields 24.3 g. (73.6% of the theory) N-(p-chloro-benzoyl)-γ-(3,4-dimethoxy-anilino) - butyric acid of the M.P. 88–89° C. (from acetic ester).

EXAMPLE 12

N-acetyl-γ-(2,6-dimethyl-anilino)-butyric acid

From 19.5 g. γ-bromo-butyric acid ethyl ester, 12.1 g. 2,6-dimethyl-aniline and 10.1 g. triethylamine (method of working, according to Example 2), one obtains 20 g. (85% of the theory) γ-(2,6-dimethyl-anilino)-butyric acid ethyl ester, B.P.$_{0.01\,mm.}$=91° C. By means of acylation with 50 ml. acetic acid anhydride (for the method of working, see Example 1), this ester is converted into 21 g. (89% of the theory) N-acetyl-γ-(2,6-dimethyl-anilino)-butyric acid ethyl ester, an oil that is not distillable, whose saponification with alcoholic potash lye yields 15.5 g. (82% of the theory) N-acetyl-γ-(2,6-dimethyl-anilino)-butyric acid of the M.P. 123–124° C. (from benzene).

EXAMPLE 13

N-(o-chloro-benzoyl)-γ-(2,6-dimethyl-anilino)-butyric acid 17.8 g. γ-2,6-dimethyl-anilino)-butyric acid ethyl ester (see Example 12) is acylated with 14.6 g. o-chloro-benzoyl chloride and 6.6 g. pyridine in 160 ml. benzene. One obtains 26.2 g. (92% of the theory) N-(o-chloro-benzoyl)-γ-(2,6-dimethyl-anilino)-butyric acid ethyl ester, an oil that is not distillable, which ester is converted by saponification with alcoholic potash lye into 17.7 g. (73.2% of the theory) N-(o-chloro-benzoyl)-γ-(2,6-dimethyl-anilino)-butyric acid of the M.P. 170.5–171.5° C. (from acetic ester).

EXAMPLE 14

N-(p-chloro-benzoyl-γ-(2,6-dimethyl-anilino)-butyric acid 200 g. γ-(2,6-dimethyl-anilino)-butyric acid ethyl ester (see Example 12) is acylated with 163 g. p-chloro-benzoyl chloride and 74 g. pyridine in 2 liter benzene. 280 g. (88% of the theory) N-(p-chloro-benzoyl)-γ-(2,6-dimethyl-anilino)-butyric acid ethyl ester is obtained as an oil that is insoluble in water and not distillable. The saponification of this ester with a solution of 63 g. potassium hydroxide in 1 liter ethanol (see Example 1) yields 186 g. (72% of the theory) N - (p-chloro-benzoyl)-γ-(2,6-dimethyl-anilino)-butyric acid of the M.P. 126.5–127.5° C. (from acetic ester).

EXAMPLE 15

N-(p-chloro-benzoyl)-β-(p-phenetidino)-propionic acid 18.1 g. β-bromo-propionic acid ethyl ester and 27.4 g. p-phenetidine is heated for 5 hours to 100° C. After the cooling off the mixture is stirred up with ether and the p-phenetidine hydrobromide is filtered off. 21.7 g. (91.8% of the theory) β - (p-phenetidino)-propionic acid ethyl ester, B.P.$_{0.02\,mm.}$=83–87° C. remains as ethereal residue. By acylation with 17.5 g. p-chloro-benzoyl chloride and 7.9 g. pyridine in 200 ml. benzene one obtains from this 31.6 g. (92% of the theory) N-(p-chloro-benzoyl)-β-(p-phenetidino)-propionic acid ethyl ester as an oil that is not distillable. The saponification of this ester with alcoholic potash lye yields 18 g. (61.7% of the theory) N-(p-chloro-benzoyl)-β-(p-phenetidino)-propionic acid of the M.P. 52-53° C. (from isopropanol).

EXAMPLE 16

N-(p-chloro-benzoyl)-β-(2,6-dimethyl-anilino)-propionic acid 18.1 g. β-bromo-propionic acid ethyl ester, 24.2 g. 2,6-dimethylaniline, and 0.5 ml. pyridine is heated for 10 hours to 100° C. after the cooling off the mixture is stirred up with ether, it is filtered, and the residue of evaporation of the filtrate is distilled in vacuo. One obtains 17.8 g. (80.5% of the theory) β - (2,6-dimethyl-anilino)-propionic acid ethyl ester, B.P.$_{0.02 mm.}$=76-80° C. By acylation with 15.5 g. p-chloro-benzoyl chloride and 6.9 g. pyridine in 150 ml. benzene the ester is converted into 26 g. (90% of the theory) N - (p-chloro-benzoyl)-β-(2,6-dimethyl-anilino)-propionic acid ethyl ester, an oil which can not be distilled. The saponification of this ester with alcoholic potash lye results in 15.3 g. (64% of the theory (N-(p-chloro-benzoyl) - β-(2,6-dimethyl-anilino)-propionic acid of the M.P. 162-163° C. (from acetic ester).

EXAMPLE 17

N-(p-chloro-benzoyl)-δ-(p-phenetidino)-valerianic acid 20.9 g. δ-bromo-valerianic acid ethyl ester, 15.7 g. p-phenetidine, 10.1 g. triethylamine, and 50 ml. toluene is heated for 12 hours to 100° C. After the cooling off, the triethylamine hydrobromide is filtered off and the filtrate is evaporated. The residue of evaporation is distilled in the medium-high vacuum range. One obtains 19.5 g. (73.5%) δ-(p-phenetidino)-valerianic acid ethyl ester of a B.P.$_{0.02 mm.}$=160-165° C. and a M.P. of 30° C. (from petroleum ether). By acylation with 12.9 g. p-chloro-benzoyl chloride and 5.8 g. pyridine in 150 ml. benzene one obtains from this 27.8 g. (93.5%) N-(p-chloro-benzoyl)-δ-(p-phenetidino)-valerianic acid ethyl ester. This compound is oily and not distillable undecomposed. It is saponified, as described in Example 1, with alcoholic potash lye and yields after working up 23.8 g. (92%) N-(p-chloro-benzoyl) - δ-(p-phenetidino)-valerianic acid of the M.P. 135-136° C. (from acetic ester).

EXAMPLE 18

N-(p-chloro-benzoyl)-ε-(p-phenetidino)-caproic acid 22.9 g. ε-bromo-caproic acid ethyl ester, 13.7 g. p-phenetidine, 10.1 g. triethylamine, and 50 ml. toluene is heated for 3 hours to 100° C. After the working up, described in Example 17, one obtains 24.9 g. (89%) ε-(p-phenetidino)-caproic acid ethyl ester of the M.P. 54-55° C. (from petroleum ether). The acylation of this compound with 15.5 g. p-chloro-benzoyl chloride and 7.0 g. pyridine in 250 ml. toluene yields 33.2 g. (89%) N- (p-chloro-benzoyl)-ε-(p-phenetidino) caproic acid ethyl ester which is saponified with alcoholic potash lye pursuant to Example 1. One obtains 22.0 g. (71%) N-(p-chloro-benzoyl)-ε-(p-phenetidino)-caproic acid of the M.P. 83.5-84.5° C. (from cyclohexane).

EXAMPLE 19

N-(p-chloro-benzoyl)-δ-(p-anisidino)-valerianic acid 51.3 g. 1-(p-anisidino)-piperidone-2 of the M.P. 62° C., 160 ml. ethanol, and 28 ml. sulfuric acid is heated for 30 hours to boiling. After the evaporation of the excess of ethanol the residue is dissolved in water, the aqueous solution is neutralized with sodium hydrogen carbonate and the reaction product is extracted with benzene. One obtains 52.3 g. (83.3%) δ-(p-anisidino)-valerianic acid ethyl ester of the M.P. 44-45° C. (from petroleum ether). The ester is dissolved in 250 ml. benzene and acylated by the addition of 36.4 g. p-chloro-benzoyl chloride and 16.4 g. pyridine. Thereby, one obtains 77.0 g. (95%) N-(p-chloro-benzoyl)-δ-(p-anisidino)-valerianic acid ethyl ester as a viscous oil that does not allow itself to be distilled undecomposed. The saponification of the ester with alcoholic potash lye, as described in Example 1, yields 64.4 g. (90.2%) N-(p-chloro-benzoyl)-δ-(p-anisidino)-valerianic acid of the M.P. 131-132° C. (from acetic ester).

EXAMPLE 20

N-(p-chloro-benzoyl)-γ-(p-benzyloxy-anilino)-butyric acid 19.5 g. γ-bromo-butyric acid ethyl ester, 19.9 g. p-benzyloxyaniline, and 12.9 g. N-ethyl-diisopropyl amine is heated for 2 hours to 100° C. The reaction product is dissolved in ether, is filtrated, and the residue remaining after the evaporation of the ether is recrystallized from light gasoline. One obtains 29.3 g. (93.6%) γ-(p-benzoyloxy-anilino)-butyric acid ethyl ester of the M.P. 39° C. This ester is dissolved in 75 ml. benzene and acylated by the addition of 16.4 g. p-chloro-benzoyl chloride and 7.4 g. pyridine. Thereby, 40.1 g. (94.7%) N-(p-chloro-benzoyl)-γ-(p-benzyloxy-anilino)-butyric acid ethyl ester is obtained as an oil that is not distillable. The saponification of this ester with alcoholic potash lye yields 27.0 g. (71.8%) N-(p-chlorobenzoyl) - γ-(p-benzyloxy-anilino)-butyric acid of the M.P. 143.5-144.5° C. (from isopropyl alcohol).

EXAMPLE 21

N-(p-chloro-benzoyl)-γ-(p-hydroxy-anilino)butyric acid 17.2 g. N-(p-chloro-benzoyl)-γ-(p-benzyloxy-anilino)-butyric acid is dissolved in 350 ml. tetrahydrofuran and upon the addition of 10 g. palladium-carbon (5% Pd) treated with hydrogen gas in an hydrogenation apparatus. After the termination of the hydrogen absorption the catalyst is filtered off and the solvent is evaporated. The residue is dissolved in a little acetic ester and is crystallized out again upon the addition of cyclohexane. One obtains 12.1 g. (89.5%) N - (p-chloro-benzoyl)-γ-(p-hydroxy-anilino)-butyric acid of the M.P. 170-171° C.

I claim:

1. Acylated anilino-carboxylic acids of the general formula

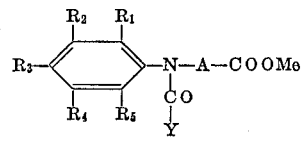

wherein the residues are, each one considered individually, $R_1$, $R_2$, $R_3$, $R_4$, $R_5$: hydrogen, alkyl, alkoxy, up to 4 carbon atoms, chloro, and the trifluoromethyl group, $R_3$ is the above definition and also the benzyloxy or hydroxy group, A is propylene, Y is an alkyl- or cycloalkyl residue up to 6 carbon atoms, an unsubstituted aryl residue, an aryl residue substituted by a halogen atom or by an alkyl-, alkoxy-, group up to 6 carbon atoms, or a trifluoromethyl-, group and Me is hydrogen or a salt-forming, pharmacologically acceptable cation.

2. The compounds of claim 1 wherein Y is lower alkyl.

3. The compounds of claim 1 wherein Y is chlorophenyl.

4. The compounds of claim 1, wherein Me is hydrogen.

5. The compounds of claim 1 wherein one or two of $R_1$ to $R_5$ are methyl, methoxy, chloro or trifluoromethyl.

6. The compounds of claim 4 where two of $R_1$ to $R_5$ are methoxy.

7. N-(o-chloro-benzoyl)-γ - (2,6 - dimethyl - anilino)-butyric acid.

8. N-(p-chloro-benzoyl)-γ-(3,4 - dimethoxy-anilino)-butyric acid.

9. N-(p-chloro-benzoyl) - γ - (2,6 - dimethyl-anilino)-butyric acid.

10. N-(p-chlorobenzoyl) - γ - (p-phenetidino)-butyric acid.

11. N-(p-chloro-benzoyl)-γ-(2,4 - dimethoxy-anilino)-butyric acid.
12. N-acetyl-γ-(m-chloro-anilino)-butyric acid.
13. N-(p-chloro-benzoyl)-γ-(p-anisidino)-butyric acid.
14. The acylated anilino-carboxylic acid of the formula

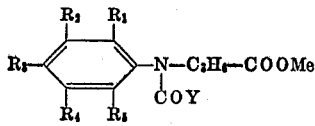

wherein $R_1$, $R_2$, $R_4$ and $R_5$ are each one hydrogen, alkyl, alkoxy, wherein the alkyl is 1 to 4 carbon atoms, chloro or trifluoromethyl, $R_3$ has the definition of $R_1$, $R_2$, $R_4$ or $R_5$ and benzyloxy or hydroxyl, Y is chlorophenyl and Me is hydrogen or a pharmaceutically acceptable salt thereof.

15. The compound of claim 14 wherein Me is hydrogen.
16. The compound of claim 14 wherein Me is sodium potassium, calcium, magnesium, aluminum, glusosamine, ethylene diamine, N-methyl glucosamine, ethanolamine, diethanolamine or triethanolamine.
17. The compound of claim 14 wherein Y is para-, or ortho-chlorophenyl.
18. The compound of claim 14 wherein $R_1$ to $R_5$ is selected from hydrogen, alkyl or alkoxy wherein the alkyl group is 1 to 2 carbon atoms.
19. The compound of claim 14 wherein $R_3$ is the alkoxy group, $R_1$, $R_2$, $R_4$ and $R_5$ being hydrogen.
20. The compound of claim 14 wherein $R_1$ and $R_5$ are alkyl, $R_2$, $R_3$ and $R_4$ being hydrogen.
21. The compound of claim 14, wherein $R_3$ is the alkoxy group, $R_1$, $R_2$, $R_4$ and $R_5$ being alkoxy or hydrogen.
22. The compound of claim 19, $R_3$ being the methoxy group.

References Cited
UNITED STATES PATENTS
3,042,715  7/1962  Obendorf et al. _____ 260—518
3,048,626  8/1962  Wallingford _____ 260—518

LORRAINE A. WEINBERGER, Primary Examiner

R. S. WEISSBERG, Assistant Examiner

U.S. Cl. X.R.

260—448 R, 471 A, 501.11, 516, 518 R, 519; 424—319